(12) United States Patent
Leek et al.

(10) Patent No.: US 7,392,963 B1
(45) Date of Patent: Jul. 1, 2008

(54) SUPERSONIC FLIGHT VEHICLE

(75) Inventors: Stanley Leek, Hatfield (GB); Hugh R. Joiner, Hatfield (GB); Brian R. Caro, Hatfield (GB)

(73) Assignee: MBDA UK Limited, Stevenage, Hertfordshire (GB)

( * ) Notice: Subject to any disclaimer, the term of this patent is extended or adjusted under 35 U.S.C. 154(b) by 0 days.

(21) Appl. No.: 06/252,230

(22) Filed: Mar. 31, 1981

(30) Foreign Application Priority Data

Apr. 2, 1980 (GB) .................................. 8010353

(51) Int. Cl.
*F41G 7/26* (2006.01)
(52) U.S. Cl. ...................................... 244/3.13; 244/130
(58) Field of Classification Search ................. 244/3.13, 244/3.14, 3.16, 3.17, 3.19, 119, 121, 129.1, 244/129.3, 130; 102/213, 214; 343/705, 343/708, 872
See application file for complete search history.

(56) References Cited

U.S. PATENT DOCUMENTS

| | | | | | |
|---|---|---|---|---|---|
| 3,005,407 | A | * | 10/1961 | Haraden | 102/214 |
| 3,007,051 | A | * | 10/1961 | Amara et al. | 89/41 EA |
| 3,128,965 | A | * | 4/1964 | Ziemer | 343/705 |
| 3,477,667 | A | * | 11/1969 | Lock | 244/121 |

* cited by examiner

*Primary Examiner*—Timothy D. Collins
(74) *Attorney, Agent, or Firm*—Nixon & Vanderhye P.C.

(57) ABSTRACT

A supersonic guided weapon has radiation sensitive apparatus carried behind a radiation transparent window the window being formed within an open recess in the weapon nose, the recess being such that at supersonic speeds it forms shock waves which trap air within the recess to provide a measure of kinetic heat insulation for the window and also a minimum of supersonic drag. An elongate nose region can be provided ahead of the recess to house further radiation sensitive or radiation emitting apparatus.

4 Claims, 3 Drawing Sheets

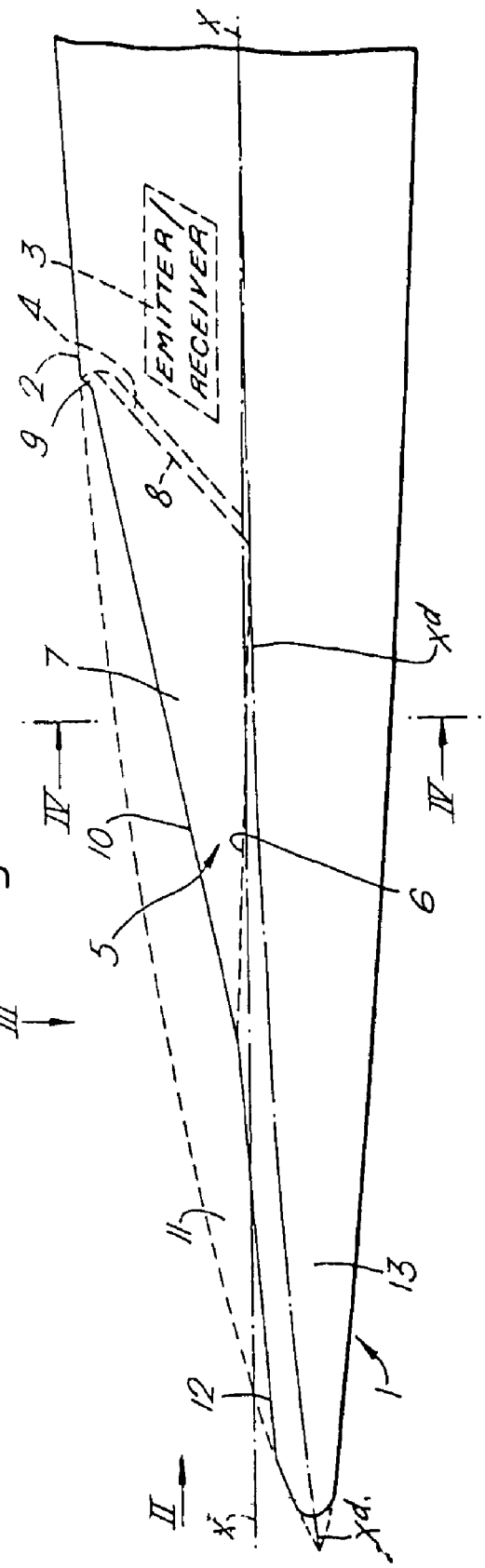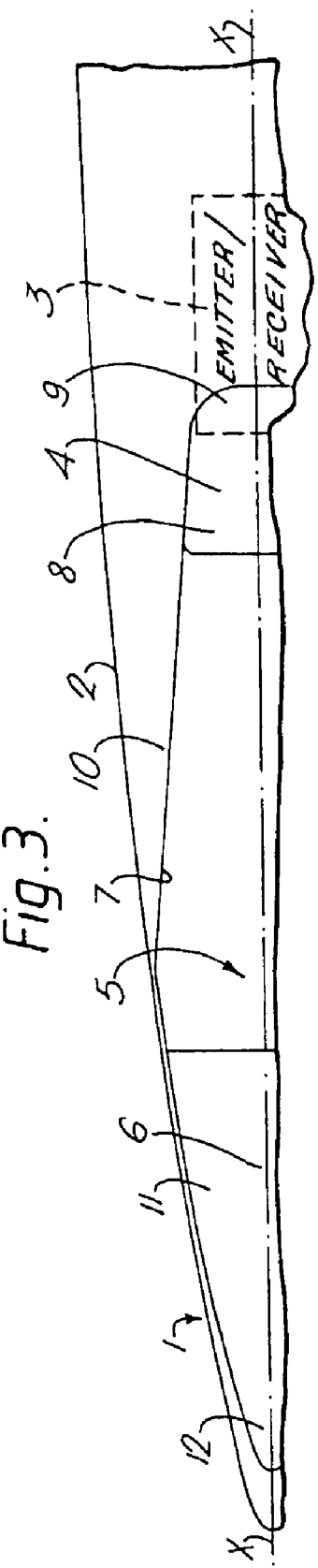

SUPERSONIC FLIGHT VEHICLE

This invention relates to supersonic flight vehicles. Some such vehicles may carry two radiation emitting and/or receiving devices, each requiring to emit and/or receive radiation in the general direction of the longitudinal axis of the vehicle.

For example, one device can be associated with guidance or surveillance apparatus, and the other device can be associated with similar apparatus adapted for use when the first mentioned apparatus is not functioning efficiently. Alternatively, one device can be associated with guidance, and the other with surveillance apparatus, for example.

It is an object of the present invention to provide a flight vehicle in which at least one, and preferably two radiation emitting and/or receiving devices can be accommodated without excessively degrading the performance of either and without excessively adding to the in-flight drag of the vehicle.

According to the invention a supersonic flight vehicle includes a longitudinal axis, a nose region having an external surface shaped to diverge gradually rearwardly from the longitudinal axis, panel means of radiation transparent material through which radiation can pass from the external surface to form a recess in the nose region within which recess the panel means lies, the recess effecting a shock wave formation in supersonic flow over the nose region which tends to trap air within the recess.

According to a further aspect of the present invention, a flight vehicle having a longitudinal axis and carrying two radiation emitting and/or receiving devices the radiation to and/or from each requiring to travel in the general direction of the longitudinal axis, includes an external surface shaped to diverge gradually rearwardly from the longitudinal axis, panel means of radiation transparent material through which radiation associated with one of said radiation emitting and/or receiving devices can pass, inset wall means extending from the external surface to form a recess within which the panel means lies, the recess effecting a shock wave formation in supersonic flow over the external surface which tends to trap air within the recess, and a nose region which lies generally forward of the panel means and to and/or from which radiation associated with said other of said radiation emitting and/or receiving devices can travel without obfuscation.

Preferably the panel means forms part of the inset wall means.

Preferably the inset wall means includes spaced side wall regions, a base wall region connecting the side wall regions, and a rear wall region terminating the side wall regions and the base wall region. In this case, the panel means forms at least part of the rear wall region.

Where said other of said radiation emitting and/or receiving devices is carried by the nose region, it is preferably of strip-like form wrapped around a surface of the nose region. Alternatively, it can be housed within the nose region.

Some embodiments of a flight vehicle, according to the invention, are described with reference to the accompanying drawings in which:—

FIG. 1 is a side view of a nose region of a flight vehicle,

FIG. 3 is a plan view, that is to say, a view upon Arrow III of FIG. 1,

Figure 2:
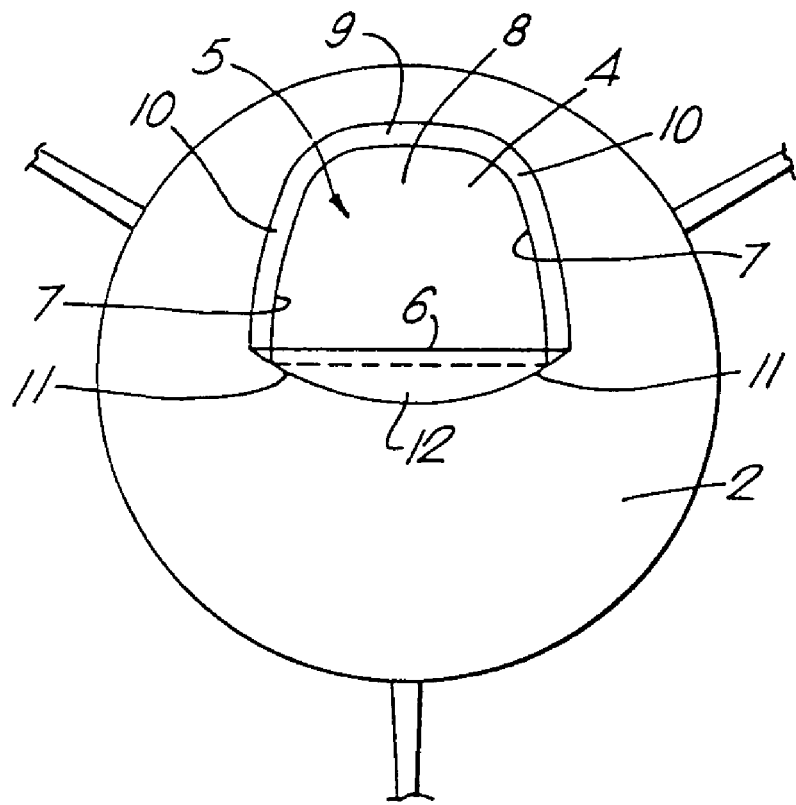
FIG. 2 is a front view, that is to say, a view upon Arrow II of FIG. 1.
Figure 4:
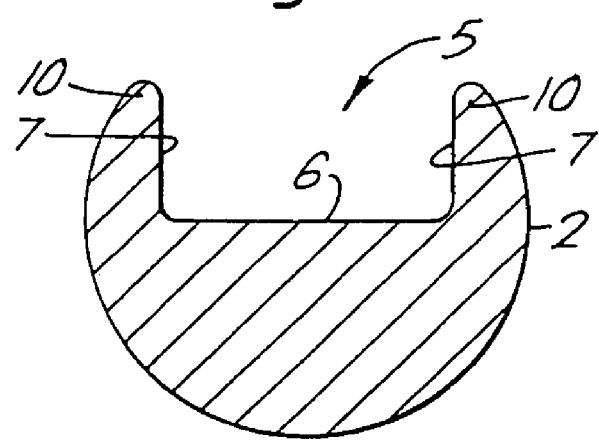
FIG. 4 is a cross-section view upon Arrows IV-IV of FIG. 1.

Referring to FIGS. 1 to 4, a guided weapon capable of speeds in excess of Mach One, possibly in the region of Mach Seven, has a body in the form of slim cylinder with an elongate nose portion 1. The nose portion has a high length to diameter ratio; it is of slender conical or ogival form. The body has a longitudinal axis X-X but conveniently the nose portion 1 has a slight permanent droop as exemplified by curve $X^d$-$X^d$ in FIG. 1. The external surface 2 of the nose region is, in effect, shaped to diverge rearwardly in a gradual manner from the axis X-X, so that a minimum of supersonic drag is effected.

The weapon carries a radiation emitting and/or receiving device shown generally at 3 positioned behind a radiation transparent panel or window 4. The device 3 may be associated with apparatus (not shown) positioned elsewhere within the vehicle remote from the window 4 and a suitable path is then provided between the window and the apparatus.

Irrespectively, the window 4 must be located so that radiation emitted or reflected by a target or by some other source is incident upon it or so that radiation emitted by the device 3 is suitably radiated. Since the path of this radiation is in the general direction of the longitudinal axis X-X of the weapon, that is to say, aligned with or near the line of flight, naturally there are problems in suitably accommodating the window 4 in the weapon without causing excess supersonic drag and without subjecting it to excessive kinetic heating.

Accordingly, suitable accommodating means are provided in the form of inset walls in the nose region which form a recess 5. The recess has a base wall region 6 generally lying in a plane which includes the axis X-X, or which diverges only slightly from it, spaced side wall regions 7 which extend from opposite edges of the base wall region 6 to the exterior surface 2, and an end wall region 8 which terminates the side wall regions 7 and the base wall region 6 by lying transversely to the axis X-X and obliquely to it.

The window 4 forms at least part of the end wall region 8.

For aerodynamic purposes, a lip 9 is formed between the end wall region 8 (the window 4) and the exterior surface 2. This lip projects forwards and extends the full width of the recess. In effect, it forms a continuation of those lips 10 formed where the side wall regions 7 adjoin the external surface 2.

The side wall regions 7 are cut away forwardly at 11, and the base wall region 6 has a downwardly sloping forward region at 12, to allow a reasonably large capture or diffusion area for the radiation.

In use, at supersonic speeds, it is found that the recess forms a shock wave pattern in the airflow over the nose region which tends to trap air within the recess 5. This air is relatively stagnant and provides an insulant for the window 4. The side wall regions 7 help to prevent excessive sideways spillage of the trapped air, whilst the lip 9 provides a re-attachment point for shock waves formed upstream.

Since neither the window 4 nor the device 3 protrude into the supersonic airstream, and the recess is, in effect, ignored by the supersonic flow, the arrangement described results in an acceptably small drag increase over a smoothly continuous exterior nose surface, so that the cruise performance of the weapon is not severely degraded.

As an alternative to the position described, the window 4 may be included in another inset wall region of the recess 5 especially if the recess configuration differs markedly from that configuration described.

The position of the window 4 is such that a nose region 13 lies generally forward of it. This region 13 conveniently can be utilised to carry a further radiation emitting and/or receiving device.

Figure 5:
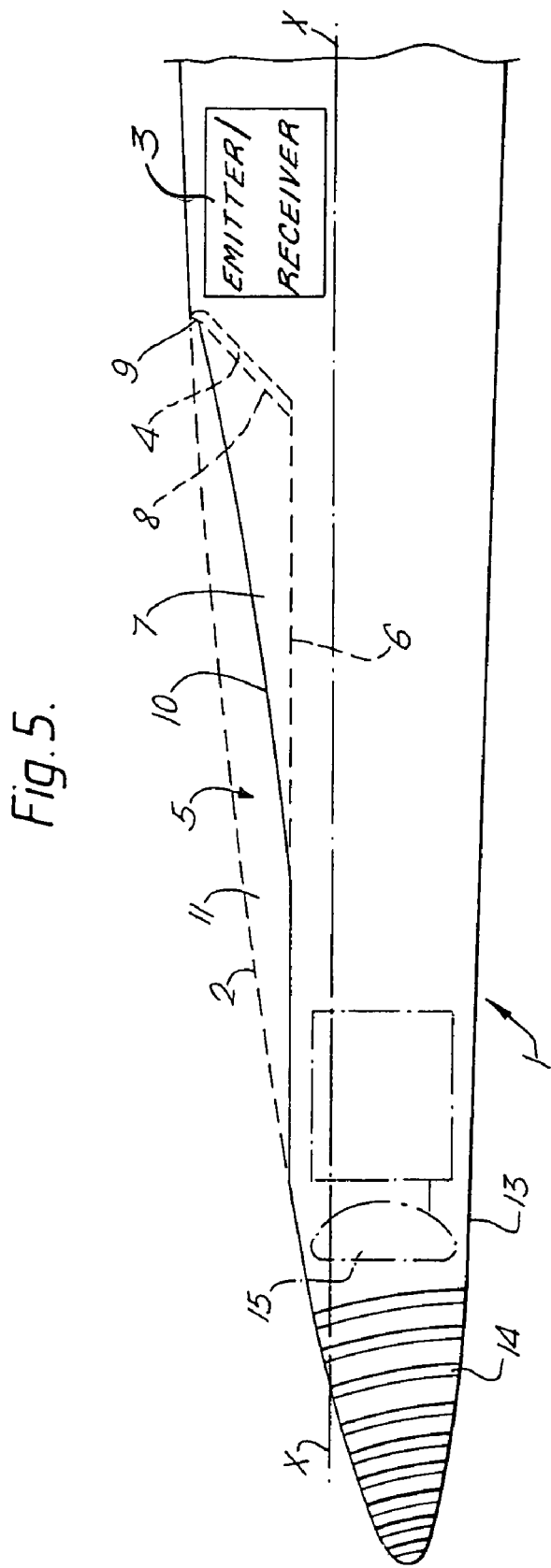
FIG. 5 is a view similar to FIG. 1 but illustrating alternative embodiment.

Referring now to FIG. 5, in which like reference numerals refer to like components, those components referenced 3-12 are positioned well aft their position illustrated in FIGS. 1 to 4. This allows sufficient surface area of the nose region 13 for the further radiation emitting and/or receiving device to be in the form of a strip 14 wrapped around and carried on said surface area. Alternatively, the further radiation emitting and/or receiving device may be housed within the nose region 13 since there is adequate stowage volume therein. This alternative is shown at 15 in broken outline.

We claim:

1. A supersonic guided weapon including a longitudinal axis, a nose region having an external surface shaped to diverge gradually rearwardly from the longitudinal axis, panel means of radiation transparent material, and a first radiation emitting and/or receiving device located behind said panel means, inset wall means extending from said external surface comprising spaced-apart side wall regions which face one another and lie generally parallel to the longitudinal axis and an end wall region extending between the side wall regions, said inset wall means forming a recess means in the nose region within which the panel means lies, said recess means being substantially unobstructed, with said recess means effecting a shock-wave formation in supersonic flow over the nose region which tends to trap air in the recess means.

2. A supersonic guided weapon according to claim 1, wherein said first radiation emitting and/or receiving device is disposed so that the radiation to or from said first radiation emitting/receiving device travels in the general direction of the longitudinal axis and said weapon including a second radiation emitting/receiving device, the radiation to and/or from which also travels in the general direction of the longitudinal axis, said nose region being generally forward of the panel means to and/or from which said radiation associated with second radiation emitting/receiving device travels without obfuscation.

3. A supersonic guided weapon according to claim 1, in which the panel means forms at least part of the end wall region of the inset wall means.

4. A supersonic guided weapon according to claim 2, in which the second radiation emitting/receiving device is carried by the nose region and is of strip-like form wrapped around a surface of the nose region.

* * * * *